(12) United States Patent
Matufuji et al.

(10) Patent No.: US 6,886,672 B2
(45) Date of Patent: May 3, 2005

(54) POWER TRANSMITTING APPARATUS FOR A WORKING VEHICLE

(75) Inventors: Mizuya Matufuji, Amagasaki (JP); Masashi Inanaga, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 43 days.

(21) Appl. No.: 10/253,069

(22) Filed: Sep. 24, 2002

(65) Prior Publication Data

US 2003/0075411 A1 Apr. 24, 2003

(30) Foreign Application Priority Data

Sep. 25, 2001 (JP) ........................................ 2001-291190

(51) Int. Cl.$^7$ .......................... B60K 17/28; F16H 57/06; G05G 5/08
(52) U.S. Cl. ..................... 192/13 R; 192/12 C; 192/15; 192/17 A; 192/18 A
(58) Field of Search ............................. 192/12 C, 17 R, 192/17 A, 13 R, 15; 74/606 R

(56) References Cited

U.S. PATENT DOCUMENTS

| | | | | |
|---|---|---|---|---|
| 4,613,024 A | * | 9/1986 | Irikura et al. ............. | 192/18 A |
| 4,751,989 A | * | 6/1988 | Shinokawa et al. ....... | 192/13 R |
| 5,415,257 A | * | 5/1995 | Shimamura et al. .......... | 192/15 |
| 5,542,306 A | * | 8/1996 | Fernandez .................. | 74/15.86 |
| 6,003,391 A | * | 12/1999 | Kojima et al. ............. | 74/15.66 |
| 6,199,653 B1 | * | 3/2001 | Matsufuji et al. ........... | 180/233 |
| 6,450,309 B1 | * | 9/2002 | Hirai et al. ................ | 192/3.63 |
| 6,487,924 B2 | * | 12/2002 | Matsufuji et al. ............. | 74/331 |
| 2003/0042104 A1 | * | 3/2003 | Matsfuji et al. ......... | 192/87.11 |

FOREIGN PATENT DOCUMENTS

| | | |
|---|---|---|
| JP | 63-023222 | 6/1988 |
| JP | 10-217785 | 8/1998 |

* cited by examiner

Primary Examiner—Saul Rodriguez

(57) ABSTRACT

A power transmitting apparatus comprises a housing having an opening at its end surface in the longitudinal direction thereof to be closed by a cover member (33), which supports an end of a brake support shaft (60) rotatably supporting a brake shoe (61). A hydraulic cylinder (63) for operation the brake is detachably attached to a side wall of the housing. A piston (64) of the hydraulic cylinder contacts with a free end of the brake shoe. The cover member also supports ends of a clutch shaft (26) and a PTO shaft (29), while a clutch housing (38) of a PTO clutch (27) is provided on the clutch shaft so as to be braked by the brake shoe in the state of the PTO clutch disengaged, thereby constituting a subassembly. By attaching the cover member to the end surface of the housing so as to close the opening, all the brake support shaft, the clutch shaft and the PTO shaft supported by the cover member are installed in the housing.

1 Claim, 10 Drawing Sheets

POWER TRANSMITTING APPARATUS FOR A WORKING VEHICLE

BACKGROUND OF THE INVENTION

1. Field of the Invention

The present invention relates to a construction of a power transmitting apparatus adapted to a working vehicle, particular, of a power transmitting apparatus comprising a housing, an opening provided at end surfaces in the longitudinal direction of the housing, a cover member closing the opening, the cover member supporting an end of a clutch shaft provided thereon with a clutch housing and an end of a PTO shaft extending outward from the housing, a hydraulic PTO clutch installed in the clutch housing in order to switch on or off power to the PTO shaft, and a brake provided with a brake shoe for braking the clutch housing in the state of the PTO clutch disengaged.

2. Related Art

Such power transmitting apparatuses for a working vehicle are disclosed in the Japanese Utility Model Sho. 63-23222 and the Japanese Patent Laid Open Gazette Hei. 10-217785. The brake which chooses the above-mentioned clutch housing as a braked member may be regarded as a brake of the simplest structure among brakes for breaking the PTO shaft through the clutch shaft.

The brake described in the Japanese Utility Model Sho. 63-23222 is constructed so that a support shaft rotatably supporting a brake shoe is supported by a protruded portion of an inner surface of one side wall of the housing, a hydraulic cylinder for operating the brake is detachably attached into the one side wall, and a piston of the hydraulic cylinder is connected to a free end of the brake shoe through a link.

Therefore, the brake must be previously installed into the housing and the link must be provided to connect the piston and the free end of the brake shoe in order to install the clutch shaft and the PTO shaft into the housing at the same time of attachment of a cover member to an end of the housing for closing the opening at the end of the housing on the precondition that the PTO clutch is installed in the clutch housing fixed on the clutch shaft and ends of the clutch shaft and the PTO shaft are supported by the cover member. Consequently, it is a weak point that there are many processes for assembling.

Furthermore, the brake described in the Japanese Patent Laid Open Gazette Hei. 10-217785 is constructed so that a support shaft rotatably supporting a brake shoe is supported by a plate member, which is disposed within an opening on an upper surface of the housing so as to be attached to the housing, a hydraulic cylinder for operating the brake is installed in the plate member, and a piston of the hydraulic cylinder is contacted with a free end of the brake shoe.

Therefore, the plate member must be further attached to the housing so as to installing and for the brake to be installed after such a similar installation of the clutch shaft and the PTO shaft into the housing at the same time of attachment of a cover member to an end of the housing for closing the opening at the end of the housing on the precondition that the PTO clutch is installed in the clutch housing fixed on the clutch shaft and ends of the clutch shaft and the PTO shaft are supported by the cover member as mentioned above. Consequently, many processes of assembling and a redundant part called the plate member are required

SUMMARY OF THE INVENTION

An object of the present invention is to provide a power transmitting apparatus comprising a housing, an opening provided at end surfaces in the longitudinal direction of the housing, a cover member closing the opening, the cover member supporting an end of a clutch shaft which is installed in a clutch housing and an end of a PTO shaft which extends out of the housing, a hydraulically controlled PTO clutch installed in the clutch housing in order to switch on or off power to the PTO shaft, and a brake provided with a brake shoe for braking the clutch housing in the state of the PTO clutch disengaged, wherein the power transmitting apparatus is simplified in its assembling and requires no redundant part.

To achieve the object, in the power transmitting apparatus according to the present invention, the brake shoe is supported by a brake support shaft whose end is supported by the cover member, and a piston of a hydraulic cylinder for operating the brake contacts with a free end of the brake shoe. Therefore, the brake shoe and the hydraulic cylinder are perfectly separated from each other. Before installing the brake and the PTO clutch into the apparatus, the brake support shaft previously supporting the brake shoe, the clutch shaft on which the clutch housing is provided and incorporates the PTO clutch previously, and the PTO shaft are supported by the cover member so as to constitute a sub assembly. The required thing for installing the brake and the PTO clutch into the housing is only to installing the sub assembly at the same time of attachment of the cover member to the end of the housing, thereby simplifying the assembling of the power transmitting apparatus. The hydraulic cylinder may be attached into one side wall of the housing before or after the installation of the subassembly. No additional exclusive part is required.

DETAILED DESCRIPTION OF THE PREFERRED EMBODIMENT

Figure 1:
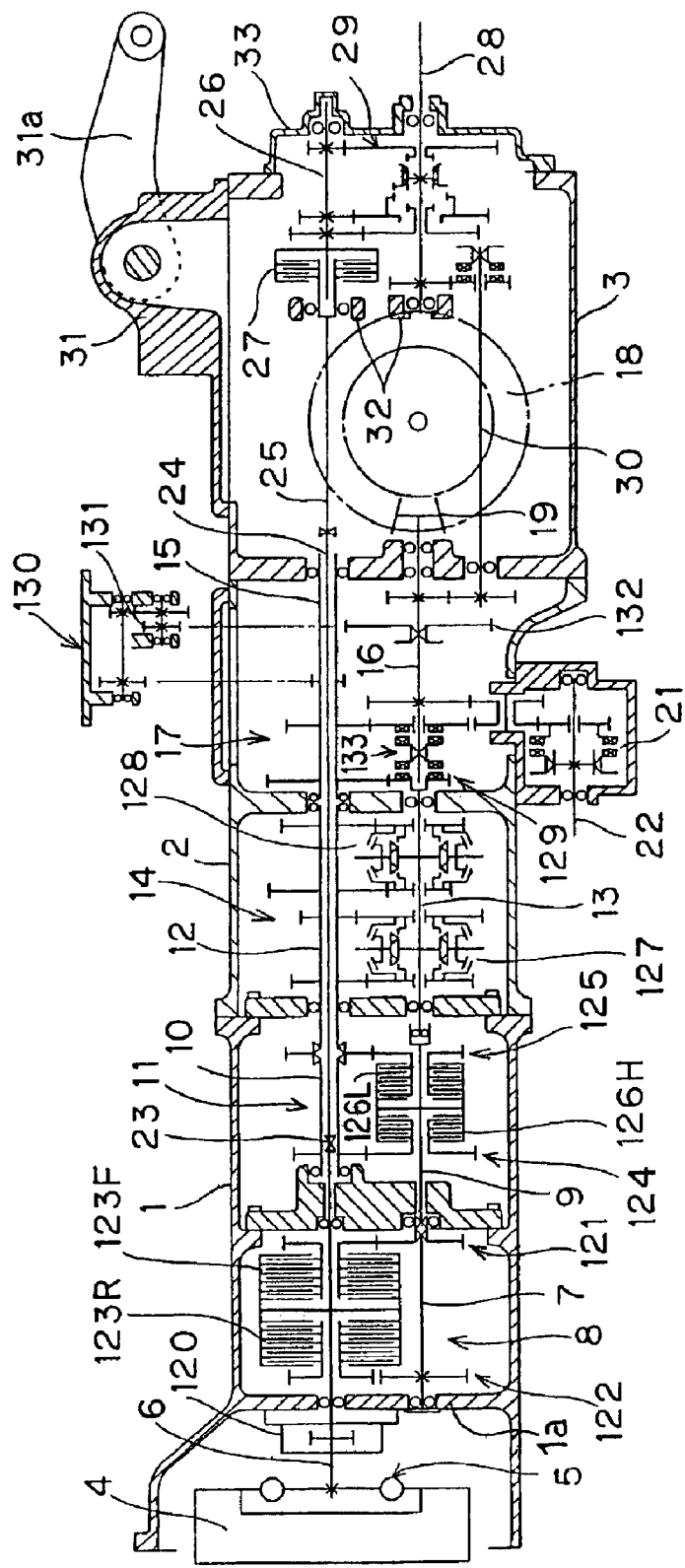
FIG. 1 is a systematic sectional side view of a power transmitting apparatus equipped on a tractor according to one embodiment of the present invention.

Referring to FIG. 1, a body of a power transmitting apparatus for a tractor consists of a front housing 1, a transmission casing 2, and a rear housing 3, which are formed successively in a longitudinal direction. In a foremost portion of the front housing 1 is installed an engine flywheel 4, to which a driving shaft 6 is connected by a buffer coupling 5. And the driving shaft 6 is provided within a front half portion of the front housing 1.

Within the front half portion of the front housing 1 is provided a reversing arrangement 8, which is disposed between the driving shaft 6 and a transmission shaft 7 installed under the driving shaft 6. Within the rear half portion of the front housing 1 is provided a high/low speed-changing arrangement 11, which is disposed between a driving shaft 9 connected with the transmission shaft 7 and a hollow driven shaft 10 disposed coaxially with the driving shaft 6.

Furthermore, within the front half portion of the transmission casing 2 is provided a main speed-changing arrangement 14, which is disposed between a driving shaft 12 connected with the driven shaft 10 and a driven shaft 13 disposed coaxially with the driving shaft 9. Within the rear half portion of the transmission casing 2 is provided an auxiliary speed-changing arrangement 17, which is disposed between the driven shaft 13 and a propeller shaft 16 disposed coaxially with the driven shaft 13, and contains a hollow counter shaft 15 disposed coaxially with the driving shaft 12.

A rear end of the propeller shaft 16 is extended within the rear housing 3, and equipped thereon with a bevel pinion 19, which is engaged with a large diameter input gear 18 of a differential gear (not shown) disposed between axles of left and right rear-wheels. Left and right front-wheels are actuated, if necessary, in addition to the left and right rear wheels. For actuating the front-wheels, a front-wheel driving PTO casing 20 is installed in a lower portion of the transmission casing 2. The front-wheel driving PTO casing 20 is equipped therein with a front-wheel driving shaft 22 which is actuated by the propeller shaft 16 through a front-wheel driving clutch 21.

Through a coupling 23, the driving shaft 6 is connected with a transmission shaft 24 penetrating the driven shaft 10, the driving shaft 12, and the counter shaft 15. In the rear housing 3, a transmission shaft 25 is connected with the transmission shaft 24, and a PTO clutch 27 is disposed between the transmission shaft 25 and a clutch shaft 26 disposed in the rear of the transmission shaft 25. A PTO speed-changing arrangement 29 is provided between the clutch shaft 26 and a PTO shaft 28 extended from the inside of the rear housing 3 to the rearward of the housing. A ground PTO system for actuating the PTO shaft 28 at the speed in proportion to a traveling speed is also provided. The ground PTO system is constructed in such a way that a transmission shaft 30 actuated by the propeller shaft 16 is extended to the front end portion of the PTO shaft 28 within the rear housing 3.

On the upper surface of the rear housing 3 is provided a hydraulic lifting device 31, which is equipped with left and right lift arms 31a for moving up and down a working machine (not shown) actuated by the PTO shaft 28.

In the middle of the rear housing 3 is provided support wall portions 32 which are integrated with the rear housing 3, and in the rear end of the rear housing 3 is provided openings which are closed with a cover member 33. As clearly shown in FIG. 2, a rear end portion of the transmission shaft 25 is supported by the support wall portion 32. Moreover, the both ends of the clutch shaft 26 are supported by the cover member 33 and in a bearing hole in the end of the transmission shaft 25, respectively.

Both end portions of the PTO shaft 28 are formed into respective splined portions 28a and 28b, whose splines differ in a pitch mutually. One of the splined portions 28a and 28b is selected to be protruded backward from the cover member 33 for connection with a universal joint of a working machine (not shown). The other splined portion 28a or 28b of the PTO shaft 28 is inserted forward into a hollow rear portion of a transmission shaft 34. In the transmission shaft 34, a middle splined portion 28c formed on the PTO shaft 28 between the splined portions 28a and 28b is fitted to the transmission shaft 34, thereby making the PTO shaft 28 rotatable integrally with the transmission shaft 34. Both ends of the transmission shaft 34 are supported by the support wall portion 32 and the cover member 33, respectively. A ring gear 35 is fixed around the transmission shaft 34 within the cover member 33. A rotation-pickup sensor 36 is supported by the cover member 33 so as to confront the ring gear 35. The rotation-pickup sensor 36 detects the number of rotations of the transmission shaft 34, i.e., the PTO shaft 28.

Figure 2:
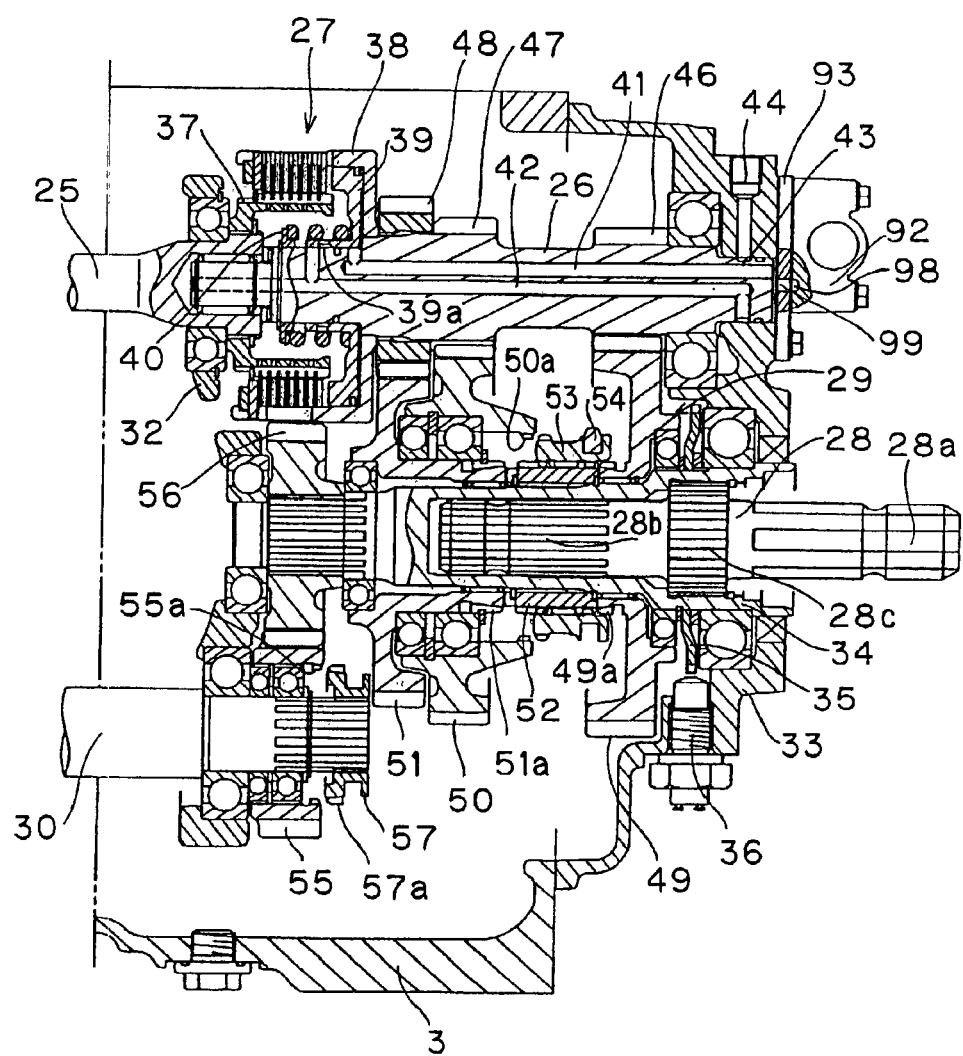
FIG. 2 is a sectional side view of a rear portion of the apparatus.

As shown in FIG. 2, a rotary member 37 is fixed on a rear end portion of the transmission shaft 25, and a clutch housing 38 on a front end portion of the clutch shaft 26. Several sheets of friction element are supported not relatively rotatably but slidably by the rotary member 37 and the clutch housing 38, respectively, thereby constituting the PTO clutch 27. Within the clutch housing 38, a piston 39 is provided so as to be moved biasedly in the retreat direction by a return spring 40. The PTO clutch 27 is constructed as a hydraulic clutch of a multi friction plate type so that the clutch engagement is attained by hydraulic pressure advancing the piston 39 against the spring 40 so as to pressurize friction elements each other. Within the clutch shaft 26, an operating oil passage 41 opens behind the piston 39, and a base end of the operating oil passage 41 is formed so as to open into the rear surface of the clutch shaft 26. Moreover, within the clutch shaft 26, a lubricating oil passage 42 for feeding lubricating oil to the friction element portion of the PTO clutch 27 is formed so that an end of the lubricating oil passage 42 is closed by the piston 39 in the shown state of clutch disengagement, and opened by an oil hole 39a of the piston 39 in the state of clutch engagement at the time of the piston 39 advancing. The lubricating oil passage 42 is provided so that lubricating oil is fed also to the portion supporting the front end portion of the clutch shaft 26. Moreover, a base end of the lubricating oil passage 42 opens into an annular oil room 43 formed between the clutch shaft 26 and the cover member 33. The annular oil room 43 is connected to a lubricating oil port 44 provided in the cover member 33.

As shown in FIG. 2, three gears 46, 47 and 48 fixedly provided on the clutch shaft 26 engage with three gears 49, 50 and 51 freely rotatably provided on the transmission shaft 34, respectively, thereby constituting the PTO speed-changing arrangement 29. On the transmission shaft 34 is attached a spline tube 52, on which a sifter sleeve 53 is provided so as not to rotate relatively. The shifter sleeve 53 has an inner peripheral surface splined so as to engage with either a gear tooth portion 49a formed on a boss of the gear 49 or a gear tooth portion 51a formed on a boss of the gear 51. Also, the shifter sleeve 53 has an outer peripheral surface toothed so as to engage with a gear toothed portion 50a formed on an inner peripheral surface of the gear 50. Due to the above construction, the sifter sleeve 53 is selectively slid from the shown neutral position by a shift fork 54 engaging with the sifter sleeve 53, so that the transmission shaft 34 can selectively obtain a transmission gear ratio. That is, a first-speed is obtained by connecting the gear 49 with the transmission shaft 34 through the teeth 49a, a second-speed is obtained by connecting the gear 50 with the transmission shaft 34 through the teeth 50a, and a third-speed is obtained by connecting the gear 51 with the transmission shaft 34 through the teeth 51a.

While a gear 55 is fitted loosely on the rear end portion of the transmission shaft 30, a gear 56 is fixed on the front end portion of the transmission shaft 34, and these gears 55 and 56 engage mutually. The clutch member 57 is provided on the transmission shaft 30 not rotatably but slidably, and a gear tooth portion 57a thereof is selectively engaged with a gear tooth portion 55a on an inner peripheral surface of the gear 55, thereby connecting the transmission shaft 30 of the ground PTO system with the transmission shaft 34.

Figure 3:
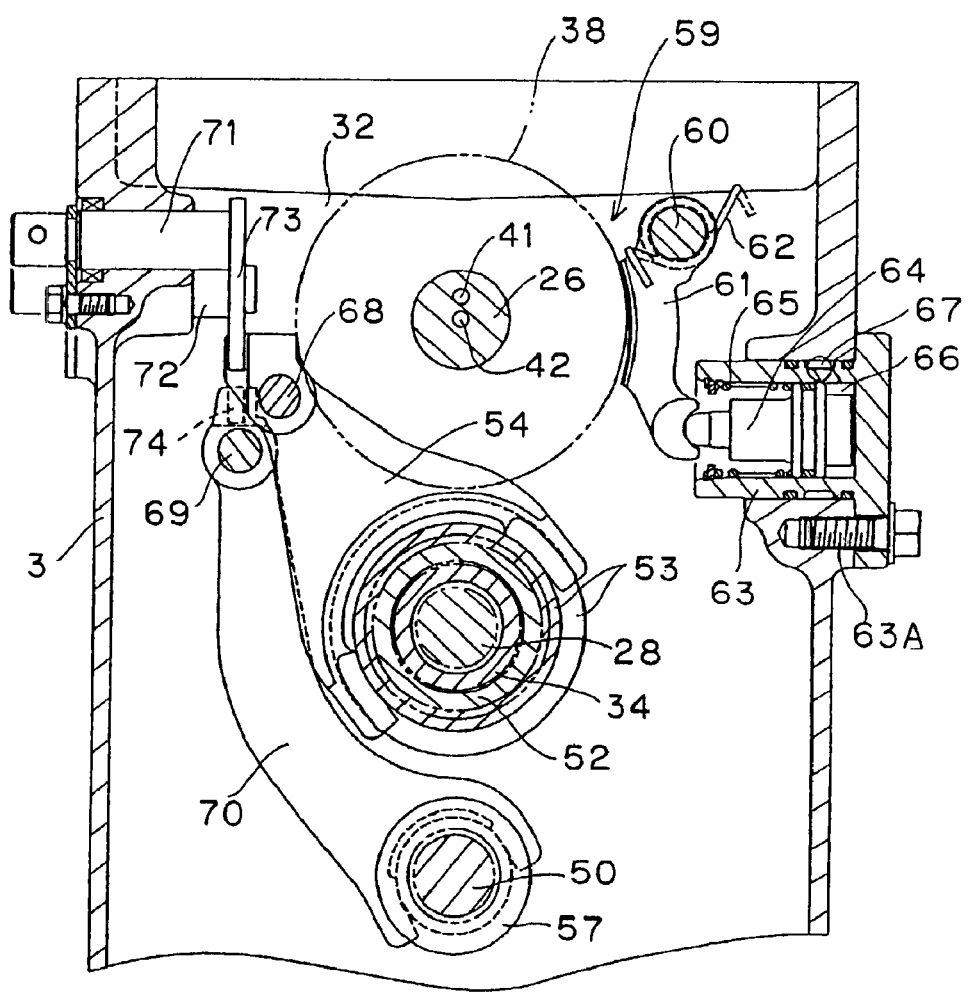
FIG. 3 is a sectional front view of the same.
Figure 4:
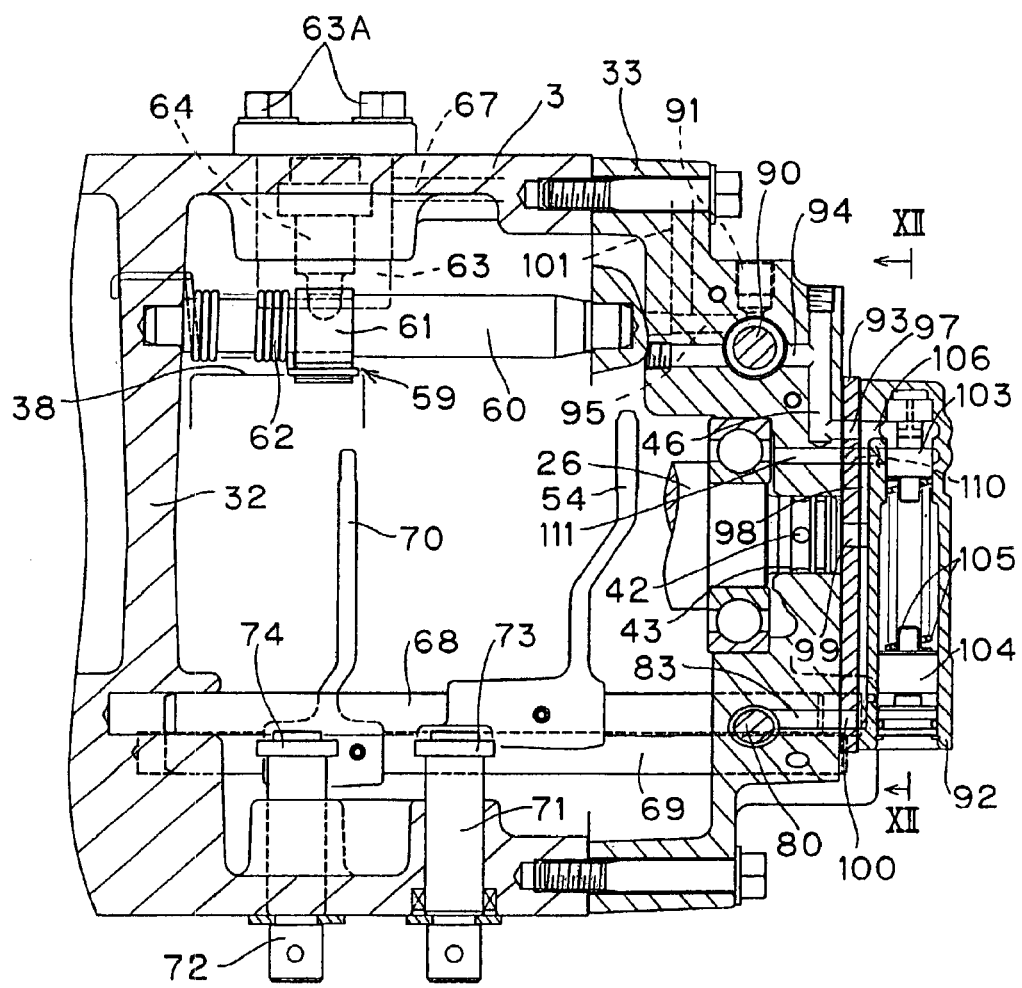
FIG. 4 is a sectional plan view of the same.

As shown in FIGS. 3 and 4, a brake 59 which brakes the clutch housing 38 in the state of the PTO clutch 27 disengaged is provided in order to stop the inertial rotation of the follower member of the PTO clutch 27 and prevent the friction elements on the follower member from rotating together with those on the driving member. A brake support shaft 60 is disposed in parallel to the clutch shaft 26. Both ends of the brake support shaft 60 are supported by the support wall portion 32 and the cover member 33, respectively. The brake support shaft 60 supports a brake shoe 61 rotatably so as to make the brake shoe 61 abut or separate against and from the outer peripheral surface of the clutch housing 38. A torque spring 62 is wound around the brake support shaft 60. One end of the torque spring 62 is engaged with the brake shoe 61, and the other end thereof with an upper surface of the support wall portion 32. The torque spring 62 biases the clutch housing 38 in such a direction that the brake shoe 61 rotates to separate from the clutch housing 38.

A hydraulic cylinder 63 having a closed outer end is oil-tightly inserted into a hole formed in one side wall of the rear housing 3, and fixed to the one side wall thereof by bolts 63A. A tip of a piston 64 fitted into the hydraulic cylinder 63 abuts against a free edge of the brake shoe 61. A spring 65 provided within the hydraulic cylinder 63 biases the piston 64 to move rearward. In the hydraulic cylinder 63 is provided an oil chamber 66, in which hydraulic pressure is generated to move the piston 64 forward so as to press the brake shoe 61 against the clutch housing 38, thereby applying the brake 59. An oil passage 67 opening into the oil room 66 is formed in the above-mentioned one side wall of the rear housing 3 so that hydraulic pressure may be generated in the oil room 66 through the oil passage 67 in the state of the PTO clutch 27 disengaged.

Figure 5:
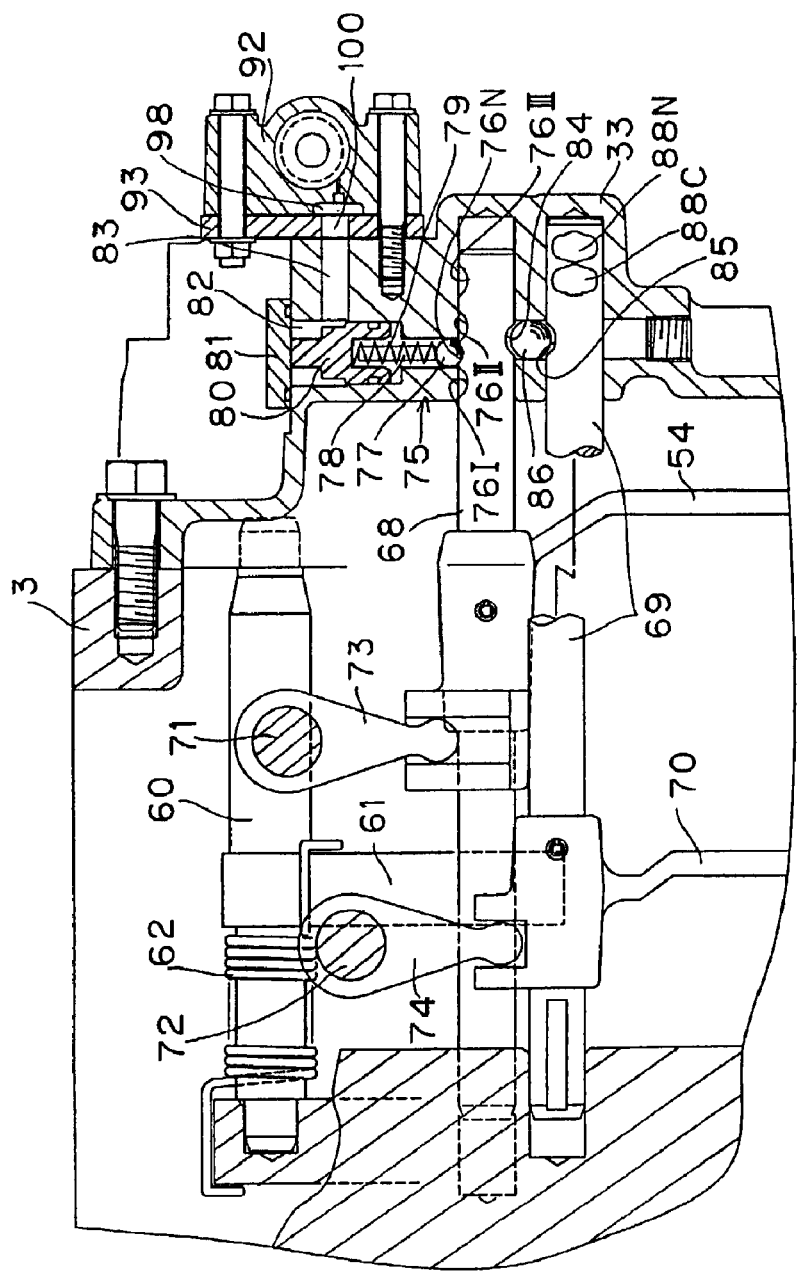
FIG. 5 is a sectional side view of a portion of the same taken in a section, which is different from the section shown in FIG. 2.

As shown in FIGS. 3–5, two fork shafts 68 and 69 are disposed in parallel to the PTO shaft 28 and the transmission shaft 34. Both ends of each fork shaft 68 or 69 is slidably supported by the support wall portion 32 and the cover member 33, respectively. To the fork shaft 68 is fixed a shift fork 54 in the PTO speed-changing arrangement 29, and to the fork shaft 69 is fixed a shift fork 70, which is engaged with the clutch member 57 on the transmission shaft 30 in the ground PTO system. The shift forks 54 and 70 engage with respective arms 73 and 74, which are provided on respective inner ends of rotation operating shafts 71 and 72 penetrating the side wall of the rear housing 3. Outer ends of the rotation operating shafts 71 and 72 are connected with respective control levers (not shown). The rotation operating shaft 71 is rotated so as to slide the shift fork 54 together with the fork shaft 68, thereby obtaining necessary displacement of the shifter sleeve 53. The rotation operating shaft 72 is rotated so as to slide the shift fork 70 together with the fork shaft 69, thereby obtaining necessary displacement of the clutch member 57.

Figure 6:
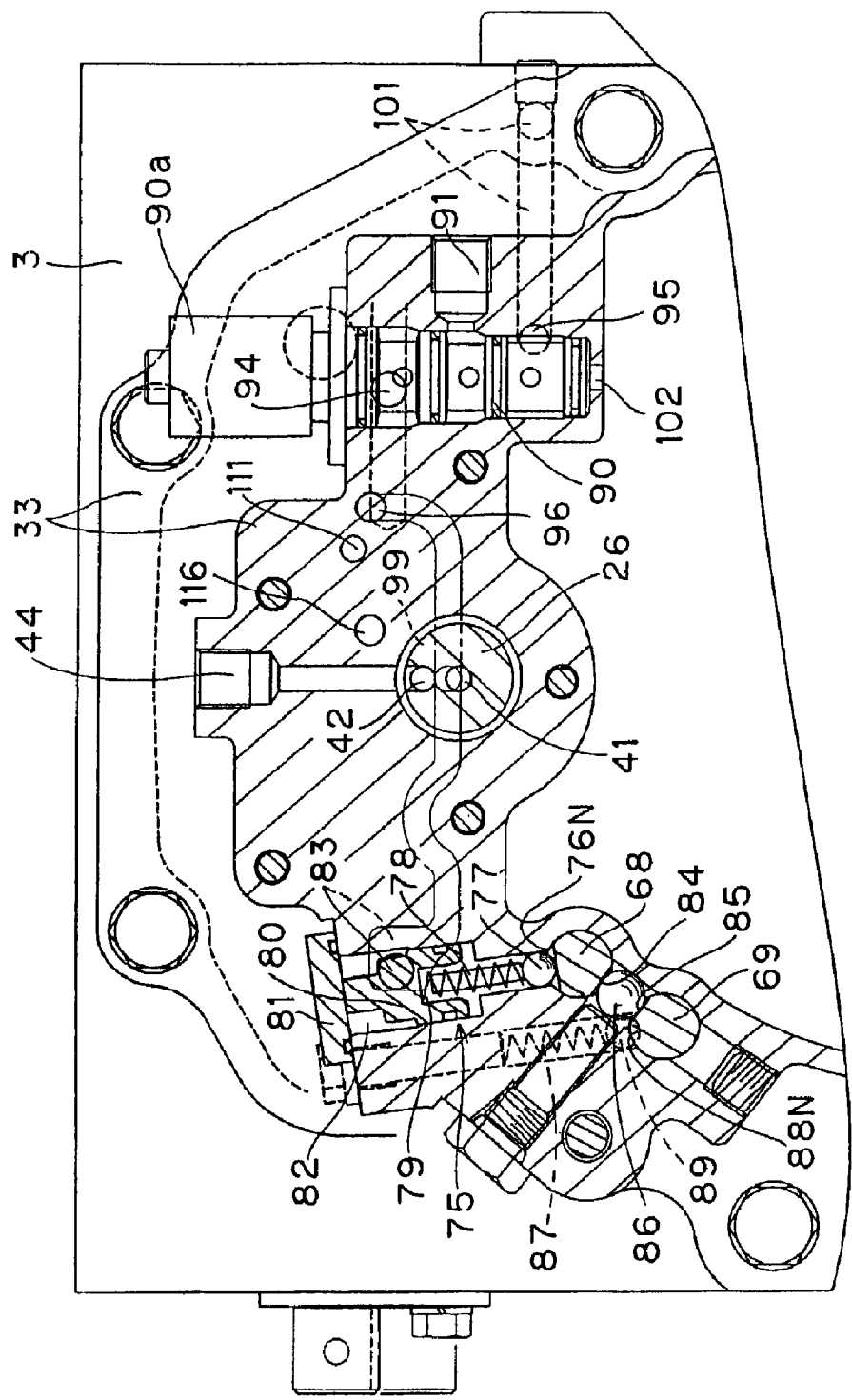
FIG. 6 is a sectional rear view of the same.

As shown in FIGS. 5 and 6, to the fork shaft 68 is attached a shift lock system 75 which prevents the fork shaft 68 from sliding in the state of the PTO clutch 27 engaged. While four slots 76N, 76I, 76II, and 76III are formed on the fork shaft 68, a ball 77 is provided within the cover member 33 so as to be selectively fitted into one of the four slots 76N, 76I, 76II, or 76III, and is biased by a spring 79 on a rod 78, thereby constituting the shift lock system 75. The base end of the spring 79 is supported by a piston 80 which is provided within a hole of the cover member 33. The hole, while an open end thereof being closed by a lid 81, serves as an oil chamber 82. Into the oil chamber 82 opens an oil passage 83, through which hydraulic pressure acts into the oil chamber 82 in the state of the PTO clutch 27 engaged. The hydraulic pressure pushes the piston 80 to a position where the rod 78 comes to be unable to move between the piston 80 and the ball 77, so that the ball 77 is fitted into one of slots 76N, 76I, 76II and 76III so as to stop the slide of the fork shaft 68, thereby holding the fork shaft 68 in one of a neutral position, a first-speed position, a second-speed position and a third-speed position so as to lock the PTO speed-changing arrangement 29. In the state of the PTO clutch 27 disengaged where hydraulic pressure doesn't act in the oil chamber 82, the ball 77 and the spring 79 holds the fork shaft 68 in position while allowing the fork shaft 68 to be free, thereby constituting a detent system.

Between the fork shafts 68 and 69 is disposed a double-engagement prevention system, which prevents the sifter sleeve 53 of the PTO speed-changing arrangement 29 and the clutch member 57 of the grand PTO system from simultaneously moving to their actuating positions. That is, as shown in FIGS. 5 and 6, in the fork shafts 68 and 69 are respectively provided slots 84 and 85, which confront mutually when the fork shafts 68 and 69 are in their neutral positions. A ball 86 between the slots 84 and 85 is disposed within the cover member 33 between the fork shafts 68 and 69. If one of the fork shafts 68 and 69 is operated so as to slide from the neutral position, and the outside surface thereof pushes the ball 86 into the slot of the other of the fork shafts 68 and 69, the ball 86 is fitted into the slot 84 or 85 to prevent the corresponding fork shaft 68 or 69 from moving.

Another detent system is provided to hold the fork shaft 69 while allowing the fork shaft 69 to be free. This detent system, as shown in FIGS. 5 and 6, is provided with a ball 89 which is biased by a spring 87 and faces into slots 88N and 88C.

As shown in FIGS. 4 and 6, a spool is inserted into a hole formed in the cover member 33 from the upper surface of the cover member 33 so as to constitute an electromagnetic directional control valve 90. An input port 91 of the electromagnetic directional control valve 90 opens at one side surface of the cover member 33. As shown in FIGS. 2, 4 and 5, on the rear of the cover member 33 is sideways installed a modulated type relief valve 92, which increases the actuating hydraulic pressure to the PTO clutch 27 gradually from the time of switching the electromagnetic directional control valve 90 from the neutral position to the actuating position. A plate member 93 is interposed between the cover member 33 and the modulated type relief valve 92.

As shown in FIGS. 4–6, an upper clutch port 94 and a lower brake port 95 serve as output ports of the electromagnetic directional control valve 90. The clutch port 94 is connected to an opening at an end of the clutch shaft 26 through an oil passage 96 in the cover member 33, an oil hole 97 in the plate member 93, an oil passage 98 formed between the plate member 93 and the relief valve 92, and an oil hole 99 in the plate member 93, so that the clutch port 94 is open for free passage to the operating oil passage 41. The oil passage 98 formed between the plate member 93 and the relief valve 92 is also open for free passage through an oil hole 100 in the plate member 93 to the oil passage 83 connected to the oil chamber 82 behind the piston 80 of the shift lock system 75. The brake port 95 is open for free passage through an oil passage 101 in the cover member 33 and the oil passage 67 in the rear housing 3 to the oil chamber 66 of the cylinder 63 for operating the brake 59. A tank port 102 of the electromagnetic directional control valve 90 is formed in the cover member 33, and opens into the rear housing 3. When the directional control valve 90 is in the shown neutral position, the brake port 95 is open for free passage to the input port 91, and the clutch port 94 to the tank port 102. A solenoid 90a is excited and located at its upper working position where the clutch port 94 is open for free passage to the input port 91, and the brake port 95 to the tank port 102.

Figure 7:
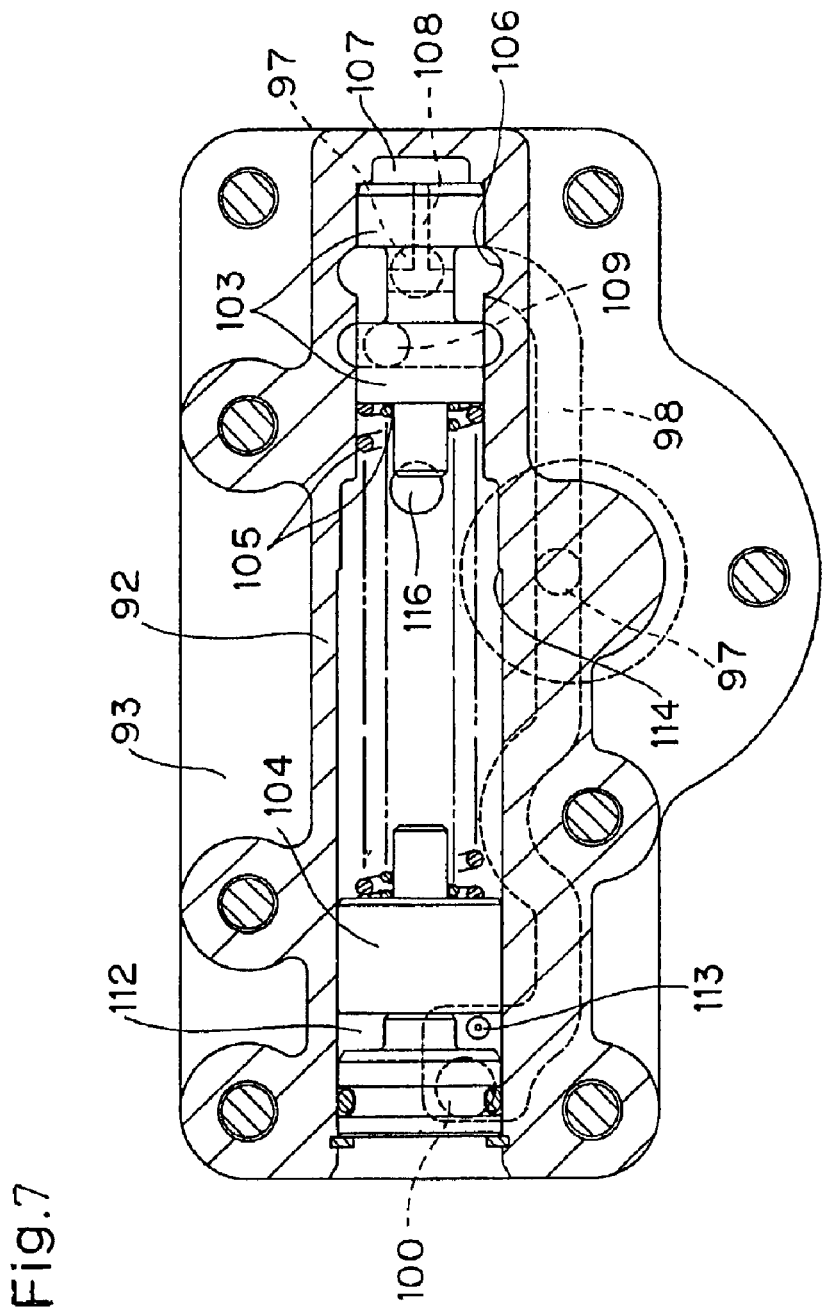
FIG. 7 is an expanded sectional view taken along a line VI—VI of FIG. 4.

FIG. 7 is an expanded sectional view of the modulated type relief valve 92, which is constituted by a valve element 103 and a control piston 104 as usual, and between the valve element 103 and the control piston 104 are provided two springs 109 for hydraulic pressure setting. As shown in FIG. 4, a hydraulic pressure input port 106 of the relief valve 92 is provided in the end of the oil passage 98 formed between the plate member 93 and the relief valve 92. The valve element 103 has an oil hole 108, through which an oil chamber 107 behind the valve element 103 is open for free passage to the hydraulic pressure input port 106. The valve element 103 relieves oil from the input port 106 to a relief port 109 by hydraulic pressure generated in the oil chamber 107. As shown FIGS. 4 and 6, the relief port 109 is open for free passage to the inside of the rear housing 3 through an oil hole 110 of the plate member 93 and an oil passage 111 of the cover member 33. The oil passage 98 is open for free passage through an orifice 113 to an oil chamber in the opposite side of the hydraulic pressure input port 106 and behind the control piston 104. From the time of switching to the actuating position of the directional control valve 90, by actuation of the hydraulic pressure through the orifice 113, the control piston 104 moves forward gradually to the position where the control piston 104 is checked by a step 114, and gradually increases the elastic stress of the spring 105 for hydraulic pressure setting, thereby increasing the actuating hydraulic pressure of the modulated type relief valve 92 gradually. A drain port 115 for draining oil from the installation space of the spring 105 is also provided in the relief valve 92, and is open for free passage into the rear housing 3 through an oil passage 116 within the cover member 33 as shown in FIG. 6.

General description will be given of other portions of the shown tractor. As shown FIG. 1, a partition wall 1a is provided in front of the reversing arrangement 8 within the front housing 1, and a gear type hydraulic pump 120 actuated by the driving shaft 6 is installed in the front surface side of the partition wall 1a. A forward-movement gear train 121 and a rearward-movement gear train 122 are provided between the driving shaft 6 and the transmission shaft 7, and on the driving shaft 6 are provided hydraulic clutches 123F and 123R for forward and rearward movement, which connect respective gears fitted loosely on the driving shaft 6 with the driving shaft 6 in above-mentioned gear trains selectively, thereby constituting a hydraulic clutch device serving as the reversing arrangement 8.

A high-speed gear train 124 and a low-speed gear train 125 are provided between the driving shaft 9 and the driven shaft 10, and on the driving shaft 9 are provided hydraulic clutches 126H and 126L for high and low speed, which connect respective gears fitted loosely on the driving shaft 9 with the driving shaft 9 in above-mentioned gear trains selectively, thereby constituting a hydraulic clutch device serving as the high/low speed changing arrangement 11. Especially, the hydraulic clutch 126L for low-speed is constructed as a spring load type clutch which is engaged by force of a spring and disengaged by hydraulic pressure. Gears are changed by feeding operating oil to both hydraulic clutches 126H and 126L simultaneously through a single oil passage within the driving shaft 9.

Four sets of speed change gear trains are provided between the driving shaft 12 and the driven shaft 13, and the gears fitted loosely on the driven shaft 13 are selectively connected with the driven shaft 13 by two sets of double synchronous clutches 127 and 128 in the above-mentioned speed change gear trains, thereby enabling the main speed-changing arrangement 14 to establish four speed stages.

The counter shaft 15 in the auxiliary speed-changing arrangement 17 is connected with the driven shaft 13 of the main speed-changing arrangement 14 by a speed reducing gear train 129, and out of the counter shaft 15 is provided a speed change gear 131, which is actuated through a gear reduction system 130 by one speed change gear on the counter shaft 15. The auxiliary speed-changing arrangement 17 is constructed so as to change four gears by sliding a shift gear 132 and a double clutch 133 provided on the propeller shaft 16 selectively.

Figure 8:
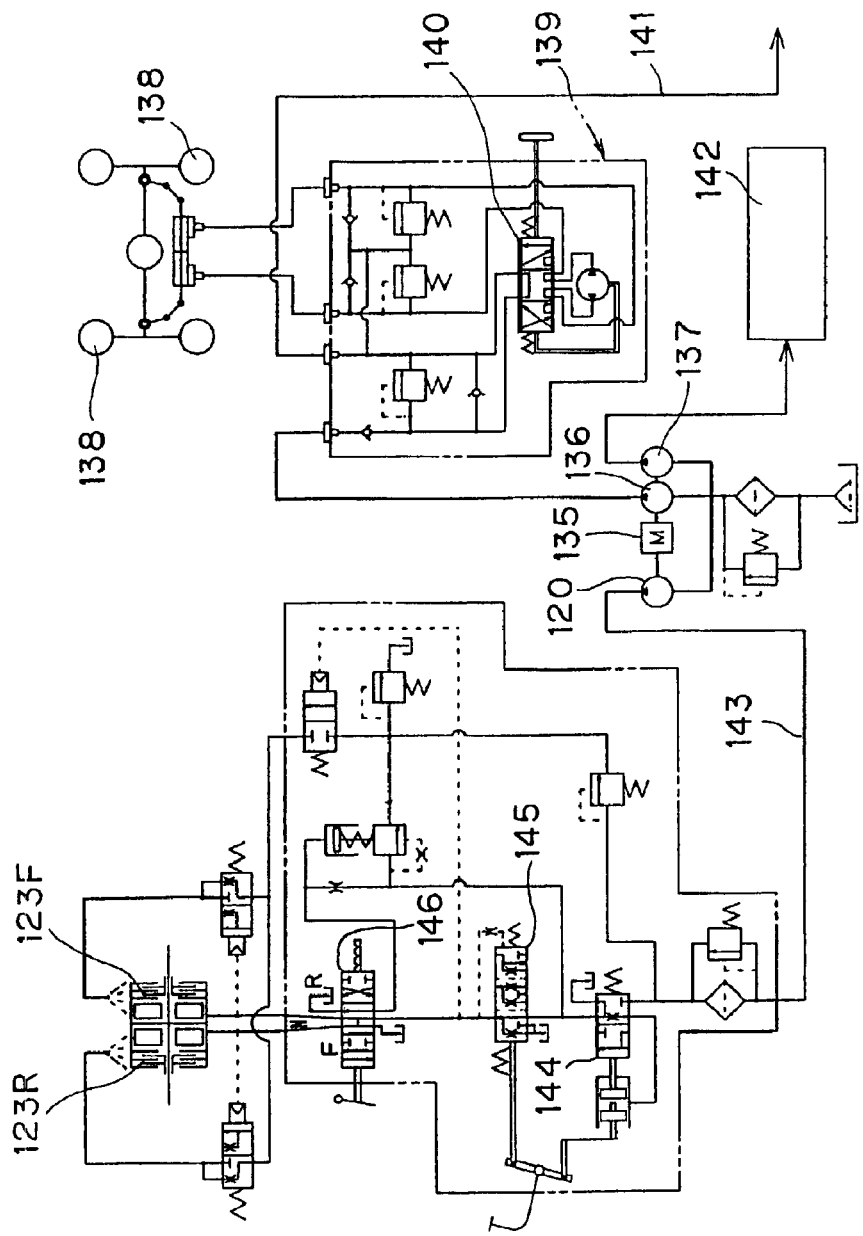
FIG. 8 is a diagram of a hydraulic circuit for the apparatus.
Figure 9:
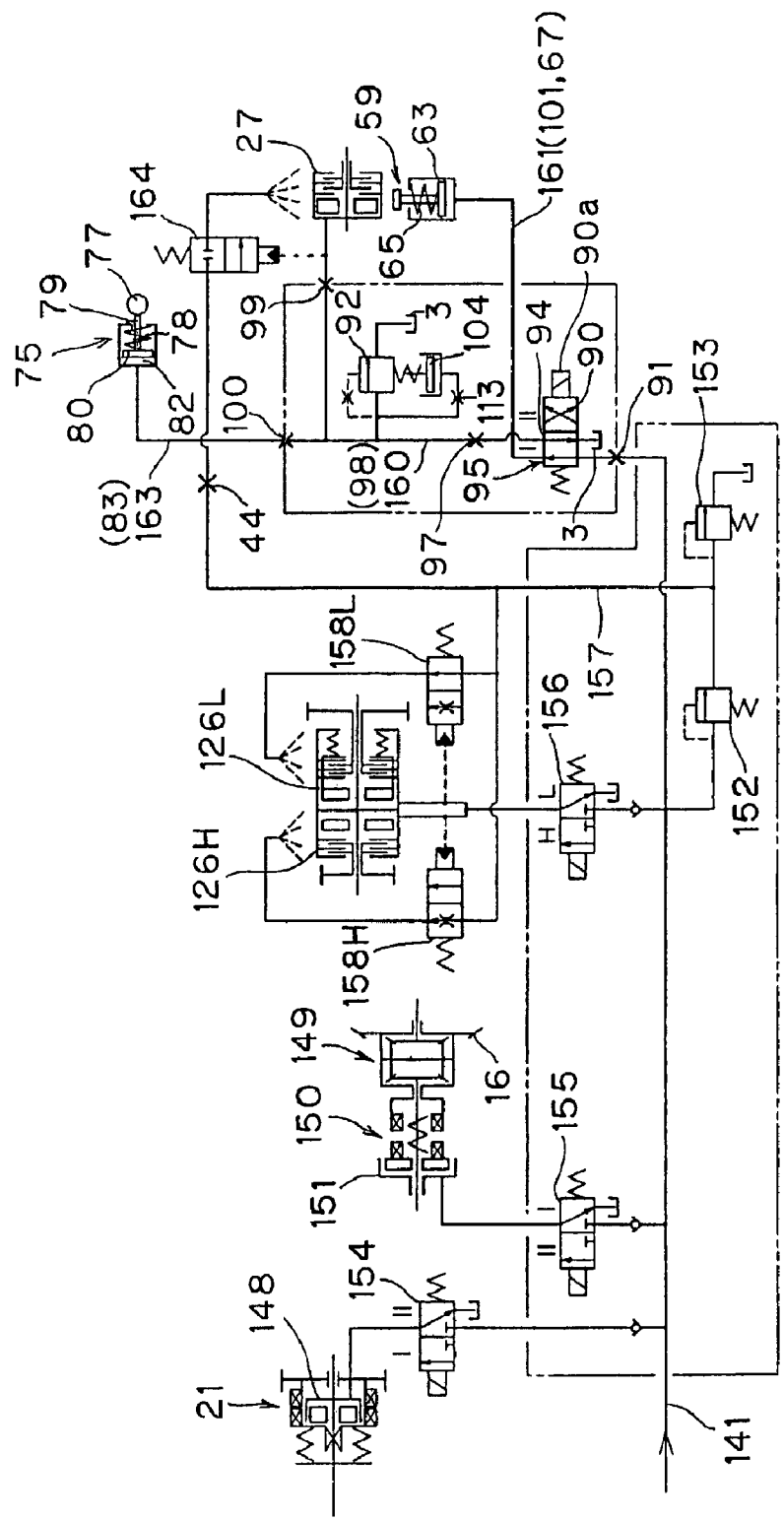
FIG. 9 is a diagram of a hydraulic circuit which follows the hydraulic circuit shown in FIG. 8.

A hydraulic circuit is shown in FIGS. 8 and 9. The hydraulic pump 120 and two other hydraulic pumps 136 and 137 actuated by an engine 135 are provided as shown in FIG. 8. The hydraulic pump 120 of those is used in order to supply hydraulic pressure to the hydraulic clutches 123F and 123R of the reversing arrangement 8. A hydraulic pump 136 supplies hydraulic pressure to a directional control valve 140 in a power steering system 139 for turning the right and left front wheels 138 rightward and leftward, and feeds the surplus oil to the PTO clutch 27 shown in FIG. 9 etc. through a circuit 141. A hydraulic pump 137 supplies hydraulic pressure to the drive circuit 142 of an external actuator attached to the tractor.

As shown in FIG. 8, a delivery circuit 143 of the hydraulic pump 120 is connected with the hydraulic clutches 123F and 123R for forward and rearward movement through an oil-passage cutoff valve 144, a pressure reducing valve 145, and a directional control valve 146. A circuit structure containing these valves for the reversing arrangement 8 is already disclosed in the Japanese Patent Laid Open Gazette Hei. 11-294580 etc. The directional control valve 146 is provided with a neutral position N, a forward-movement actuating position F where the hydraulic clutch 123F for forward movement is operated, and a rearward-movement actuating position 123R where the hydraulic clutch 123R for rearward movement is operated.

As shown in FIG. 9, the circuit 141 from the power steering system 139 is used in order to supply hydraulic pressure respectively to a hydraulic cylinder 148 for operating the front-wheel driving clutch 21 shown in FIG. 1, a hydraulic cylinder 151 for operating a differential-gear lock clutch 150 attached to a differential gear 149 for right and left rear wheels, hydraulic clutches 126H and 126L of the high/low speed changing arrangement 11 shown in FIG. 1, the PTO clutch 27, and the cylinder 63 for brakes. The hydraulic pressure of the circuit 141 is set by a relief valve 152, and in the secondary thereof is provided a relief valve 153 for setting a lubricious hydraulic pressure.

As shown in FIG. 9, the front-wheel driving clutch 21 is constructed so as to be engaged by force of a spring and disengaged by actuation of the hydraulic cylinder 148, and a directional control valve 154 thereof is provided with a disengaged clutch position I and an engaged clutch position II. The differential-gear lock clutch 150 is constructed so as to be always disengaged by force of a spring and engaged by actuation of the hydraulic cylinder 151, and a directional control valve 155 thereof is provided with a disengaged clutch position I and a engaged clutch position II.

The high/low speed-changing arrangement 11 is operated in the following way: By applying the hydraulic pressure onto both hydraulic clutches 126H and 126L simultaneously, the hydraulic clutch 126H for high speed is engaged, and the hydraulic clutch 126L for low speed is disengaged. By releasing the hydraulic pressure from both the hydraulic clutches 126H and 126L, the hydraulic clutch 126H for high speed is disengaged, and the hydraulic clutch 126L for low speed is engaged. As shown in FIG. 9, a directional control valve 156 of the high/low speed-changing arrangement 11 is provided with a high-speed position H where the hydraulic clutch 126H for high speed is engaged and a low-speed position L where the hydraulic clutch 126L for low speed is engaged. A lubricating oil supply circuit 157 is drawn from the line between both the relief valves 152 and 153, and connected with the hydraulic clutches 126H and 126L through respective flow-control valves 158H and 158L, one of which selectively feeds more lubricating oil than lubricating oil fed only to the engaged corresponding hydraulic clutch 126H or 126L.

A hydraulic pressure feed structure to the PTO clutch 27 is constructed as explained above. The electromagnetic directional control valve 90 is provided with a neutral position I and an actuating position II. At the neutral position I, a clutch circuit 160 led to the PTO clutch 27 is connected with the interior of the rear housing 3 serving as an oil reservoir so as to disengage the PTO clutch 27, and a brake circuit 161 led to the cylinder 63 for the brake is connected with the circuit 141 so as to apply the brake 59. At the working position II, the clutch circuit 160 is connected with the circuit 141 so as to engage the PTO clutch 27, and the brake circuit 161 is connected with the interior of the rear housing 3 so as to release the brake 59. The modulated type relief valve 92 is connected to the clutch circuit 160.

A shift lock circuit 163 is also connected with the clutch circuit 160, and led to the oil chamber 82 for operating the shift lock system 75. The lubricating oil supply circuit 157 is also connected with the lubricating oil port 44 so as to feed lubricating oil to the PTO clutch 27. As described above about FIG. 2, in the lubricating oil feeding mechanism to the PTO clutch 27 is provided a flow-control valve 164, which opens the lubricating oil passage 42 within the clutch shaft 26 by the piston 39 of the PTO clutch 27 only in the state of the PTO clutch 27 engaged.

Figure 10:
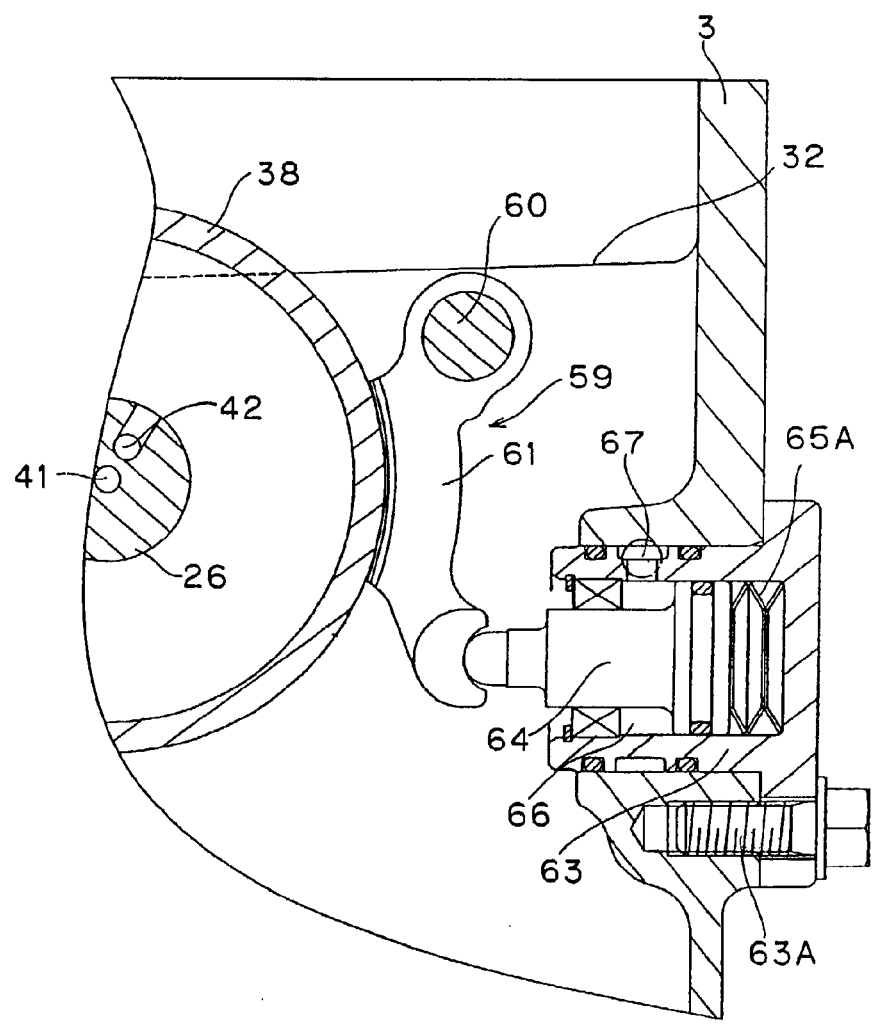
FIG. 10 is an expanded sectional front view of a portion in accordance with other embodiment of the present invention.

Another embodiment concerning the brake 59 is shown in FIG. 10. In the present embodiment, the hydraulic cylinder 63 for rotating the brake shoe 61 is provided with a disk spring 65A behind the piston 64 for biasing the brake shoe 61 so as to rotate in the braking direction of the brake 59. Hydraulic pressure in the oil chamber 66 in opposite to the disk spring 65A moves the brake shoe 61 in the brake-releasing direction of the brake 59. No spring corresponding to the torque spring 62 is provided.

POSSIBILITY OF INDUSTRIAL APPLICATION

As mentioned above, the power transmitting structure according to the present invention is useful to a working vehicle, and suitable for such a construction that the structure does not require redundant parts while simplifying assembly operations.

What is claimed is:

1. A power transmitting apparatus for a working vehicle, comprising:

a housing;

an opening provided at an end surface of the housing in the longitudinal direction of the housing;

a cover member closing the opening;

a clutch shaft, an end of the clutch shaft being supported by the cover member;

a PTO shaft extended outward from the housing, an end of the PTO shaft being supported by the cover member;

a clutch housing provided on the clutch shaft;

a hydraulic PTO clutch installed in the clutch housing in order to switch on or off power to the PTO shaft;

a brake provided with a brake shoe for braking the clutch housing in the state of the PTO clutch disengaged;

a brake support shaft disposed in the longitudinal direction of the housing, an end of the brake support shaft being supported by the cover member, the brake support shaft rotatably supporting the brake shoe;

a hydraulic cylinder for operating the brake, the hydraulic cylinder detachably attached to one side wall of the housing; and a piston of the hydraulic cylinder, the piston contacting with a free end of the brake shoe.

* * * * *